United States Patent [19]

Stefanowski

[11] Patent Number: 5,334,260
[45] Date of Patent: Aug. 2, 1994

[54] NO-CLEAN, LOW-RESIDUE, VOLATILE ORGANIC COMPOUND FREE SOLDERING FLUX AND METHOD OF USE

[75] Inventor: Krystyna Stefanowski, Chicago, Ill.

[73] Assignee: Litton Systems, Inc., Des Plaines, Ill.

[21] Appl. No.: 14,201

[22] Filed: Feb. 5, 1993

[51] Int. Cl.$^5$ ............................... B23K 35/34
[52] U.S. Cl. ........................ 148/23; 148/24; 148/25
[58] Field of Search ..................... 148/23–25

[56] References Cited

U.S. PATENT DOCUMENTS

| | | | |
|---|---|---|---|
| 3,424,625 | 1/1969 | Tlegel | 148/23 |
| 4,478,650 | 10/1984 | Zado | 148/23 |
| 4,601,763 | 7/1986 | Stratil et al. | 148/23 |
| 4,708,751 | 11/1987 | Froebel | 148/23 |
| 5,085,365 | 2/1992 | Turner | 228/223 |

*Primary Examiner*—Peter D. Rosenberg
*Attorney, Agent, or Firm*—Michael H. Wallach

[57] ABSTRACT

A no-clean, low-residue, rosin-free foam flux solution is described which comprises a cosolvent system free of volatile organic compound solvents which is comprised of (i) at least about 90% by weight demineralized water based on total weight of the flux solution and (ii) from about 1% by weight to about 5% by weight based on total weight of the flux solution of a non-volatile organic solvent forming a cosolvent with said demineralized water, said nonvolatile organic solvent having a boiling point above about 190° C. and a vapor pressure below 0.1 millimeters Hg at 25° C.; a fluxing agent present in an amount from about 1% to about 4% by weight based on total weight of the soldering flux, said fluxing agent comprising at least two carboxylic acids selected from the group consisting of $C_2$–$C_{10}$ dicarboxylic acids, monocarboxylic acids and hydroxy acids, said fluxing agent being present as solute in said cosolvents; and nonionic surfactant present in an amount of less than about 1% by weight based on total weight of soldering flux.

15 Claims, No Drawings

NO-CLEAN, LOW-RESIDUE, VOLATILE ORGANIC COMPOUND FREE SOLDERING FLUX AND METHOD OF USE

FIELD OF THE INVENTION

The invention relates to no-clean (low-residue) soldering fluxes.

BACKGROUND OF THE INVENTION

Fluxes comprised of dicarboxylic acids as fluxing agents are described in the seminal U.S. patent of Ernest G. Tiegel, U.S. Pat. No. 3,424,625. Solutions comprising a major portion of dicarboxylic acids dissolved in a minor portion of organic solvents such as lower alcohols, ethers, aldehydes, ketones and dimethyl sulfoxide are described in the Tiegel patent.

U.S. Pat. No. 4,708,751 discloses low levels of dicarboxylic acids (less than 3.5%) dissolved in organic solvents and other ingredients including low levels of rosin (less than 2%).

Halogen-free fluxes which are also rosin-free utilizing organic acid based fluxing agents are also described in the art.

U.S. Pat. No. 4,601,763 describes rosin-free and halogen-free fluxes containing low levels of dicarboxylic acids (3%) dissolved in organic solvents(s).

In U.S. Pat. No. 5,085,365 the environmental problem with using chlorofluorocarbon (CFC) solvents to remove rosin flux residue is addressed. CFC solvents evaporate into the atmosphere and cause the depletion of the protective ozone layer in the stratosphere. U.S. Pat. No. 5,085,365 describes the use of polycarboxylic acids such as citric acid as fluxing agents. Where the fluxes of U.S. Pat. No. 5,085,365 are used, rinsing is required—and thereafter, the rinse water needs to be processed because it is necessary to remove acid flux residue therefrom.

Another alternative to using rosin fluxes and cleaning with environmentally detrimental solvents is to use fluxes with a low solids content (less than 6%) as described in U.S. Pat. No. 4,708,751, where low levels of fluxing agent, namely, less than about 3.5% are described. The flux described in U.S. Pat. No. 4,708,751 is known in the electronics industry as a no-clean, low-residue or low-solids flux. No rinsing is required for this type of flux.

The current and developing problem with low-residue fluxes of all types is that such fluxes are based on alcohol and/or other volatile organic compound solvents. Such fluxes are applied to the bottom of a printed circuit assembly by pumping the flux into a wave, spraying or passing air into the flux to create a foam head and then conveying the printed circuit assembly over the flux. The next step in the process is to convey the assembly over or through a preheater to evaporate away the volatile solvent and activate the flux. Then the assembly is conveyed across a melted solder wave or pot. This rapid evaporation of the volatile solvent permits high speed conveying and soldering without spattering when the assembly touches the melted solder.

Volatile Organic Compounds (VOCs) have been described in the Federal Register (Vol.55, No.126 Friday, Jun. 29, 1990) Rules and Regulations as "any organic compound which participates in atmospheric photo-chemical reactions.". Already the State of California has recognized that VOCs emitted into the lower atmosphere contribute to the formation of smog by photochemical reaction and requires record keeping of VOC emissions.

Fluxes in use by the electronics industry for mechanized soldering of printed circuit assemblies either contain undesirable VOCs or, if water-based, contain conductive and/or undesirable levels of corrosive organic acids which must be removed with water after fluxing.

The present invention provides a VOC-free, no-clean, low-residue flux using a demineralized water-based solvent system and a foaming system which includes a nonionic surfactant and a nonvolatile organic component that is a cosolvent with the demineralized water.

SUMMARY OF THE INVENTION

It is an objective of the present invention to provide suitable fluxes for mechanized soldering of electronic assemblies. The fluxes contain no volatile organic compound solvents.

It is a further objective of the present invention to provide foam fluxes which when applied by wave, foaming or spraying, achieve high guality soldering and leave a low residual level of non-corrosive, non-conductive fluxing agent which does not require removal after soldering.

The fluxes of the present invention accomplish the foregoing objectives by use of VOC-free formulas comprising a plurality of active fluxing agents and one or more nonionic surfactants that are dissolved in a cosolvent system comprised of demineralized water and a nonvolatile solvent. Demineralized water is water treated by demineralization to remove minerals usually present in ionized form, typically by ion-exchange, distillation, or dialysis. Demineralized water obtained by ion-exchange is referred to herein as deionized water. The active fluxing agents are present at levels of about 1% to about 4% by weight. Preferably the total amounts of active fluxing agent is present in amount of from about 1% to about 3% by weight. The active fluxing agent component in the flux of the present invention is comprised of at least two fluxing agents that are selected from mixtures of (1) saturated and/or unsaturated dicarboxylic acids containing two to ten carbons; (2) one or more of the previously described dicarboxylic acids in combination with one or more monocarboxylic acid(s) and/or hydroxy acids(s); and (3) combinations of monocarboxylic acids, combinations of hydroxy acids, preferably mono-or dicarboxylic hydroxy acids, or combinations of monocarboxylic and hydroxy acids.

DETAILED DESCRIPTION OF THE INVENTION

In accordance with the present invention the flux solvent is comprised of demineralized water and nonvolatile organic solvent(s). The fluxing agent is present as solute in the flux solvent system. Suitable fluxing agents are mono- and/or dicarboxylic acids and/or hydroxy acids. One or more nonionic surfactants are also present in the flux. The total solids content of the flux (excluding water and cosolvent) is less than about 5% by weight, with at least about 1% fluxing agent being required. Fluxing agent content in the range of from at least about 1% to about 4% by weight achieves the dual objectives of satisfactory fluxing without the need to clean the soldered area after application of solder. It has been observed that in the flux formulations of the present invention, fluxing is enhanced by using a plurality of fluxing agents.

The combination of acids provides an expanded melting range at the elevated soldering temperature levels where the deionized water solvent is evaporated and also provides enhanced wetting. The combination of acids includes combinations of elevated/high melting point acids such as succinic and adipic acids and/or combinations of high melting acids mixed with smaller quantities of lower melting acids such as glutaric acid. Combining acids achieves broadening of the fluxing melting range which falls within the range delimited by the solder melting point (solidus point) and the upper soldering temperatures; that is a temperature range typically from about 180° C. to about 260° C. The combination of acids also enhances precleaning during preheating. It has been observed that there is an expanded window of flux activity when the melting range is increased.

Examples of acids among those suitable as fluxing agents in the soldering flux of the present invention are:
dicarboxylic acids: oxalic, adipic, succinic, malonic, maleic, glutaric, pimelic, suberic, azelaic, and sebacic acids.
hydroxy acids: malic, tartaric, citric, lactic, mandelic, glyceric, and glycolic acids
monocarboxylic acids: valeric, caproic, phenylacetic, benzoic, salicylic, and aminobenzoic acids The organic solvent incorporated into the foam flux solution of the present invention can be categorized alternatively as part of a flux cosolvent system or as a component of a foaming system. The organic solvent required in the present foam flux solution contributes to both systems.

The cosolvent selected is a nonvolatile organic solvent that forms a cosolvent system with demineralized water. The cosolvent has a boiling point above about 190° C. and a vapor pressure below 0.1 mm Hg at 25° C. It is present in an amount of from about 1% to about 5% by weight based on the total weight of the flux, most preferably from about 2% to about 4% by weight. The cosolvent in the flux of the present invention inhibits decomposition of the fluxing agents during exposure to hot solder and also further broadens the melting range of the mixture of fluxing agents. The cosolvent may be present in an amount by weight of about 1% to about 5%. Preferably a plurality of solvents is used. Where a plurality of cosolvents are used, they may be selected from the same or different class of solvents.

Examples of cosolvents that are among the cosolvents that may be used in the flux of the present invention are: glycerine and polyhydroxy alcohols such as alkylene polyols, including for example ethylene, propylene, butylene, and hexylene polyols; high molecular weight esters and in particular dibasic acid esters, with aliphatic dibasic acid esters of dicarboxylic acids corresponding to suitable fluxing agents being preferred; glycol ether esters, including for example diethylene glycol butyl ether acetate, tripropylene glycol methyl ether acetate, ethylene glycol phenyl ether acetate, diethylene glycol ethyl ether acetate; and, aliphatic dibasic esters such as dimethyl adipate, dimethyl glutarate and dimethyl succinate and combinations thereof. As noted previously, preferably a plurality of solvents make up the cosolvent which is used with the demineralized water. The organic cosolvents, it should be noted, appropriately are characterized in combination with the nonionic surfactant required by the present invention as part of the foaming system in the flux of the present invention.

As will be noted by reference to the specifically exemplified compounds of the cosolvent classes, the aliphatic substitutes of the cosolvents preferably are lower alkyls. The aliphatic dibasic esters are available commercially, suitably as mixtures which contain only trace amounts of volatile organic solvents.

The presence of a nonionic surfactant is essential to the present invention. The nonionic surfactant and organic solvent form the foaming system of the foaming flux.

In the present invention both cosolvent and surfactant achieve acceptable levels of flux wet out and spread on the metal surface. The foam system selected cannot foam too much or the foam head will be too stable to allow the flux bubbles to pop on the surface being fluxed and soldered. In the flux compositions of the present invention, the surfactant which is nonionic also provides the added and important attribute of enhancing the heat stability of the flux. Added heat stability impedes boil-away during soldering, which at the low flux agent content required by the present invention must be arrested/ameliorated. Thus both cosolvent and surfactant contribute to heat stabilization of the flux.

Examples of nonionic surfactants that are suitable for use in the soldering fluxes of the present invention are: phenoxypolyethoxy ethanols; perfluoralkyl alcohols; glycol fatty acid esters such as glycerol monolaurate, and/or ethylene glycol distearate; alkylaryl polyether alcohols; tertiary acetylenic glycols; ethoxylated polyoxypropylenes; and, alkoxylated phenols such as alkoxylated bisphenols. One or more nonionic surfactants may be used.

Optionally an anticorrosion agent is used to prevent/minimize oxidation of the metals being soldered. The quantities used are minimal, generally by weight based on total weight of the flux, less than about 0.5% and typically less than about 0.1% by weight. Most preferably the anticorrosion agent is present in an amount of about 0.05% by weight. Examples of anticorrosion agents among others suitable for use in the flux of the present invention are benzimidazole, benzotriazole and imidazole.

Soldering fluxes of the present invention are illustrated by reference the non-limiting examples which follow below.

EXAMPLE 1

| Fluxing Agent | |
|---|---|
| adipic acid | 1.0 weight % |
| succinic acid | 1.5 weight % |
| Foaming System | |
| Surfactant alkoxylated bisphenol A* | 0.3 weight % |
| Organic Solvent (nonvolatile organic cosolvent) | |
| hexylene glycol | 3.5 weight % |
| dimethyl adipate | 0.75 weight % |
| Deionized water | 92.6 weight % |
| Corrosion Inhibitor triazole | 0.35 weight % |

*MACOL 99A is a product of PP/G Mazer Chemical Co., 3938 Porett Drive, Gurnee, IL 60031

EXAMPLE 2

| Fluxing Agent | |
| --- | --- |
| adipic acid | 1.5 weight % |
| glutaric acid | 0.3 weight % |
| aminobenzoic acid | 0.2 weight % |
| Foaming System | |
| Surfactant perfluoroalkylethanol | 0.2 weight % |
| Organic Solvent | |
| diethylene glycol ethyl ether acetate | 2.0 weight % |
| glycerine | 1.8 weight % |
| Deionized Water | 94.0 weight % |

EXAMPLE 3

A series of experiments were conducted using the flux formulations of the present invention to evaluate the performance under production conditions. The equipment used for testing was an automatic wave soldering machine (Electrovert Mini-Pac) consisting of a foam fluxing station, preheater and wave solder pot, all inline and over which a conveyor carries printed circuit board assemblies. The printed circuit board was mounted into a dual rail fixture which was placed onto the conveyor.

For this testing, a variety of printed circuit boards were used either to produce samples for further testing of the electrical properties of the flux residue or to evaluate the ideal machine control parameters for producing acceptable soldering. Printed circuit boards were the standard IPC (Institute for Interconnecting and Packaging Electronic Circuits) B-25 which contains plated through copper holes and comb patterns for insulation resistance testing. Also used were a variety of printed circuit boards with solder plating either unfused or fused as well as bare copper boards, all double-sided with plated through holes.

After the circuit boards were placed in the fixture and on the conveyor, they traveled at a speed of 5 feet per minute across a wave of flux foam created by passing air into an aerating stone in the foam fluxing unit. It was found helpful to use a low volume air knife after the application of the flux to blow off any extra dripping flux, but this is not always necessary, depending on the action of the particular machine. Alternatively, the flux was applied by spraying to achieve a uniform coating on the circuit board surface.

An observation of the flux composition of the invention during the eight hours of foaming established that both the specific gravity and acid number were little changed because of the aeration. The following measurements underscore the advantages of the flux of the present invention over its alcohol-based counterpart.

| Test Parameter | Water-based Flux | Alcohol-based Flux |
| --- | --- | --- |
| Specific gravity @ 25° C. | | |
| Initial | 1.006 | 0.813 |
| 1-hour | 1.006 | 0.824 |
| 2-hours | 1.007 | 0.829 |
| 3-hours | 1.011 | 0.832 |
| 4-hours | 1.011 | 0.833 |
| 5-hours | 1.010 | 0.836 |
| 6-hours | 1.010 | 0.837 |
| 7-hours | 1.010 | 0.839 |
| 8-hours | 1.010 | 0.840 |
| Increase | 0.004 | 0.027 |

| Test Parameter | Water-based Flux | Alcohol-based Flux |
| --- | --- | --- |
| Acid Number g KOH/Kg flux | | |
| Initial | 21.15 | 13.89 |
| 1-hour | 21.17 | 14.99 |
| 2-hours | 21.25 | 16.34 |
| 3-hours | 21.58 | 16.76 |
| 4-hours | 21.58 | 18.62 |
| 5-hours | 22.02 | 19.14 |
| 6-hours | 21.54 | 19.86 |
| 7-hours | 22.04 | 20.34 |
| 8-hours | 21.64 | 21.18 |
| Increase | 0.49 | 7.29 |

The specific gravity is a direct indication of the rapid loss of the alcohol solvent as it evaporates into the atmosphere. This evaporation loss necessitates constant monitoring of the flux to replace the alcohol. The other measure of flux composition control is the acid number which is determined by titration and reported as grams of potassium hydroxide per liter of flux. As the solvent portion of the flux evaporates, the solids or active portion will increase accordingly.

It can readily be seen from the test data that the constant checking of flux composition required of the conventional alcohol-based fluxes is eliminated by using the water-based flux of the present invention. The low volatility cosolvent improved the heat stability of the flux by extending the time for thermal decomposition of the organic acids. It was determined that the optimum amount of cosolvent was about 1–5%, a higher amount adversely affecting the electrical resistance properties of the residue.

After application of the flux to the bottom side of the printed circuit board, the conveyor carried the board across the preheater. In the case of these tests, the preheater was a hotplate controlled at 370° C. The reason for this maximum temperature is the possibility of fire when using alcohol-based fluxes which can auto-ignite at 390° C. Another advantage of the water-based flux is the lack of flammability and the resulting increase in safety.

After numerous trials, the optimum preheat temperature measured on the topside of the printed circuit board was determined to be 105° C.–120° C. this allowed for nearly complete evaporation of the water solvent and minimized spattering when the printed circuit board contacted the solder wave. The topside measurement was equivalent to a bottom side temperature on the 1.6 mm thick epoxy-glass circuit boards of 145° C.–160° C., the ideal activating temperature of the flux which removes oxidation from the copper and/or tin-lead surfaces on the component leads and printed circuits.

After preparation by the flux across the preheater, the printed circuit board assembly was conveyed across the solder wave. The solder wave temperature for these tests was varied from 235° C. up to 260° C. with equally good soldering results with a variety of flux compositions of the.

After soldering and cooling the test boards, visual examination revealed little or no visible flux residue, a property particularly desired for applications using test probes to evaluate electrical continuity. Additionally, certain soldered boards were tested to evaluate the effect of the flux residue on the insulation resistance properties of the circuit board. For this test, the "B" pattern (0.32-mm lines and spaces) of the IPC-B-25 comb pattern boards was used. After aging at 85° C. and 85% relative humidity for 7 days at a constant bias of 50-volts, readings were taken at an applied 100-volts for one minute. The results in every case using the flux of the invention exceeded $1.6 \times 10^{11}$ ohms, considerably higher than the electronics industry acceptable value of $5.0 \times 10^8$ ohms.

The soldering tests reveal that excellent soldering can be accomplished with the flux of the present invention. The amount of residue remaining is minimal and does not affect automated probe electrical testing or the surface insulation resistance of electronic circuit board assemblies.

It will thus be seen that the objects set forth above, among those made apparent from the preceding description, are efficiently attained, and, since certain changes may be made in the above flux compositions without departing from the spirit and scope of the invention, it is intended that all matter contained in the above description shall be interpreted as illustrative and not in a limiting sense.

What is claimed is:

1. A no-clean, low-residue, rosin-free foam soldering flux solution comprising:
   a. at least about 95% by weight of a cosolvent system free of volatile organic compound solvents which is comprised of (i) at least about 90% by weight demineralized water based on total weight of the soldering flux solution and (ii) from about 1% by weight to about 5% by weight based on total weight of the soldering flux solution of a nonvolatile organic solvent forming a cosolvent with said demineralized water, said nonvolatile organic solvent having a boiling point above about 190° C. and a vapor pressure below 0.1 millimeters Hg at 25° C.;
   b. from about 1% to about 4% by weight of fluxing agent consisting essentially of two or more carboxylic acids selected from the group consisting of $C_2$-$C_{10}$ dicarboxylic acids, monocarboxylic acids and hydroxy acids, said fluxing agent being present as solute in said cosolvent system; and
   c. nonionic surfactant in an amount not exceeding about 1% by weight based on total weight of soldering flux solution.

2. The foam flux solution of claim 1 wherein a plurality of nonvolatile organic solvents are present in the cosolvent system.

3. The foam flux solution of claim 1 further comprising an anticorrosion agent present in an amount less than about 0.5% by weight based or total weight of the flux.

4. The foam flux solution of claim 2 further comprising an anticorrosion agent present in an amount less than about 0.5% by weight based or total weight of the flux.

5. The foam flux solution of claim 1 wherein fluxing agent is present in an amount by weight based on total weight of the soldering flux of from about 2% to about 3%.

6. The foam flux solution of claim 2 wherein fluxing agent is present in an amount by weight based on total weight of the soldering flux of from about 2% to about 3%.

7. The foam flux solution of claim 3 wherein fluxing agent is present in an amount by weight based on total weight of the soldering flux of from about 2% to about 3%.

8. The foam flux solution of claim 4 wherein fluxing agent is present in an amount by weight based on total weight of the soldering flux of from about 2% to about 3%.

9. The foam flux solution of claim 1 wherein the fluxing agent contains a plurality of $C_2$-$C_{10}$ dicarboxylic acids.

10. The foam flux solution of claim 2 wherein the fluxing agent contains a plurality of $C_2$-$C_{10}$ dicarboxylic acids.

11. The foam flux solution of claim 3 wherein the fluxing agent contains a plurality of $C_2$-$C_{10}$ dicarboxylic acids.

12. The foam flux solution of claim 4 wherein the fluxing agent contains a plurality of $C_2$-$C_{10}$ dicarboxylic acids.

13. A soldering process, characterized by applying on the surfaces intended for soldering, prior to the soldering, a foam flux solution according to claim 1 and preheating said surfaces to vaporize the deionized water solvent, followed by heating to the temperature required for soldering.

14. The process of claim 13 wherein the soldering surfaces are soldering surfaces of silver, copper, tin, or alloys thereof.

15. The process of claim 13 wherein the soldering surface is copper or an alloy of copper on a circuit board.

* * * * *

US005334260B1

REEXAMINATION CERTIFICATE (2705th)

United States Patent [19]

Stefanowski

[11] B1 5,334,260

[45] Certificate Issued Oct. 24, 1995

[54] NO-CLEAN, LOW-RESIDUE, VOLATILE ORGANIC COMPOUND FREE SOLDERING FLUX AND METHOD OF USE

[75] Inventor: Krystyna Stefanowski, Chicago, Ill.

[73] Assignee: Litton Systems, Inc., Des Plaines, Ill.

Reexamination Request:
No. 90/003,707, Jan. 24, 1995

Reexamination Certificate for:
Patent No.: 5,334,260
Issued: Aug. 2, 1994
Appl. No.: 14,201
Filed: Feb. 5, 1993

[51] Int. Cl.⁶ ................................. B23K 35/363
[52] U.S. Cl. ...................... 228/223; 148/23; 148/25
[58] Field of Search ................ 148/23, 25; 228/223

[56] References Cited

U.S. PATENT DOCUMENTS 5,297,721  3/1994  Schneider et al. .............. 228/223

*Primary Examiner*—Melvyn Andrews

[57] ABSTRACT

A no-clean, low-residue, rosin-free foam flux solution is described which comprises a cosolvent sstem free of volatile organic compound solvents which is comprised of (i) at least about 90% by weight demineralized water based on total weight of the flux solution and (ii) from about 1% by weight to about 5% by weight based on total weight of the flux solution of a non-volatile organic solvent forming a cosolvent with said demineralized water, said nonvolatile organic solvent having a boiling point above about 190° C. and a vapor pressure below 0.1 millimeters Hg at 25° C.; a fluxing agent present in an amount from about 1% to about 4% by weight based on total weight of the soldering flux, said fluxing agent comprising at least two carboxylic acids selected from the group consisting of $C_2$-$C_{10}$ dicarboxylic acids, monocarboxylic acids and hydroxy acids, said fluxing agent being present as solute in said cosolvents; and non-ionic surfactant present in an amount of less than about 1% by weight based on total weight of soldering flux.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *